United States Patent
Zhang et al.

(10) Patent No.: US 10,563,147 B2
(45) Date of Patent: Feb. 18, 2020

(54) FLOODING COMPOUNDS FOR TELECOMMUNICATION CABLES

(71) Applicant: Dow Global Technologies LLC, Midland, MI (US)

(72) Inventors: Yichi Zhang, Collegeville, PA (US); Mohamed Esseghir, Collegeville, PA (US); Chester J. Kmiec, Phillipsburg, NJ (US); Yi Jin, Missouri City, TX (US); Selim Yalvac, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 38 days.

(21) Appl. No.: 15/557,710

(22) PCT Filed: Mar. 14, 2016

(86) PCT No.: PCT/US2016/022254
§ 371 (c)(1),
(2) Date: Sep. 12, 2017

(87) PCT Pub. No.: WO2016/160316
PCT Pub. Date: Oct. 6, 2016

(65) Prior Publication Data
US 2018/0051225 A1  Feb. 22, 2018

Related U.S. Application Data

(60) Provisional application No. 62/140,677, filed on Mar. 31, 2015.

(51) Int. Cl.
| | | |
|---|---|---|
| *C10M 143/08* | (2006.01) | |
| *C10M 105/04* | (2006.01) | |
| *H01B 3/22* | (2006.01) | |
| *H01B 3/44* | (2006.01) | |
| *H01B 3/28* | (2006.01) | |
| *G02B 6/44* | (2006.01) | |

(52) U.S. Cl.
CPC ........ *C10M 143/08* (2013.01); *C10M 105/04* (2013.01); *G02B 6/4483* (2013.01); *H01B 3/22* (2013.01); *H01B 3/28* (2013.01); *H01B 3/441* (2013.01); *C10M 2203/022* (2013.01); *C10M 2203/024* (2013.01); *C10M 2205/028* (2013.01); *C10N 2240/50* (2013.01); *G02B 6/4413* (2013.01)

(58) Field of Classification Search
CPC ... C08K 3/04; C08K 3/22; C08K 3/26; C10M 143/08; C10M 105/04; H01B 3/22; H01B 3/44; H01B 3/28; G02B 6/44
USPC ....................................................... 524/405, 81
See application file for complete search history.

(56) References Cited

U.S. PATENT DOCUMENTS

| | | | |
|---|---|---|---|
| 4,356,342 A | 10/1982 | Verne | |
| 5,187,763 A * | 2/1993 | Tu ........................ | G02B 6/4401 385/100 |
| 5,191,004 A | 3/1993 | Maringer et al. | |
| 5,618,882 A | 4/1997 | Hammond et al. | |
| 6,085,009 A | 7/2000 | Risch et al. | |
| 6,841,643 B2 | 1/2005 | Toyoda et al. | |
| 2002/0159726 A1 | 10/2002 | Brown et al. | |
| 2003/0049002 A1 * | 3/2003 | Bosisio ................ | G02B 6/4407 385/109 |
| 2015/0043874 A1 * | 2/2015 | Sandate Aguilar .... | G02B 6/441 385/100 |
| 2016/0304650 A1 * | 10/2016 | Read ..................... | C08F 255/02 |

FOREIGN PATENT DOCUMENTS

| | | |
|---|---|---|
| EP | 2013282 B1 | 1/2010 |
| GB | 1145850 A | 3/1969 |
| WO | 2014209927 A1 | 12/2014 |
| WO | 2016/044975 A1 | 3/2016 |

OTHER PUBLICATIONS

DOW Chemical Company, Affinity GA Polyolefin elastomers, No date.*
PCT/US2016/022254, International Search Report and Written Opinion dated Jun. 6, 2016.
PCT/US2016/022254, International Preliminary Report on Patentability dated Oct. 12, 2017.

* cited by examiner

*Primary Examiner* — Deve V Hall

(57) ABSTRACT

Flooding compounds for telecommunications cables. Such flooding compounds contain a polyolefin elastomer and a hydrocarbon oil. The polyolefin elastomer has a crystallinity ranging from 10 less than 50 weight percent and a dynamic viscosity of 50,000 centipoise or less at 177° C. The hydrocarbon oil has a kinematic viscosity of 200 centistokes or less at 40° C.

14 Claims, 1 Drawing Sheet

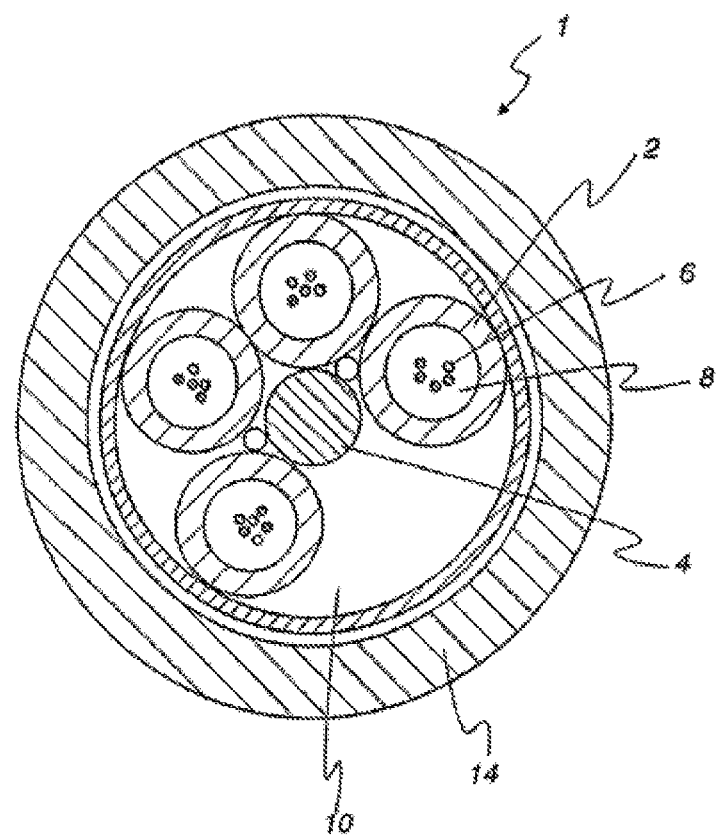

FLOODING COMPOUNDS FOR TELECOMMUNICATION CABLES

REFERENCE TO RELATED APPLICATIONS

The present application claims the benefit of U.S. Provisional Application No. 62/140,677, filed on Mar. 31, 2015.

FIELD

Various embodiments of the present invention relate to flooding compounds for telecommunication cables. Other aspects of the invention concern flooding compounds comprising a polyolefin elastomer and a hydrocarbon oil.

INTRODUCTION

Flooding compounds are materials designed to occupy void spaces in telecommunication cables, such as the void spaces typically found around and between buffer tubes commonly used in optical fiber cables. Additionally, these compounds can be used as filling materials to suspend and protect optical fibers inside buffer tubes. It is generally preferred for flooding compounds to be free flowing at elevated temperatures (such as those temperatures used when filling a telecommunication cable), and to also be easily gelled at lower temperatures to avoid dripping at room temperature. Additionally, easy-to-clean and non-messy flooding compounds are desirable for ease of installation and prevention of environmental contamination. Although advances have been made in the art of flooding compounds, improvements are still desired.

SUMMARY

One embodiment is a flooding compound for a telecommunications cable, said flooding compound comprising:
  (a) a polyolefin elastomer; and
  (b) a hydrocarbon oil,
  wherein said polyolefin elastomer has a crystallinity in the range of from 10 to less than 50 weight percent,
  wherein said polyolefin elastomer has a dynamic viscosity of 50,000 centipoise or less at 177° C.,
  wherein said hydrocarbon oil has a kinematic viscosity of 200 centistokes or less at 40° C.

Another embodiment is a flooding compound for a telecommunications cable, said flooding compound consisting of:
  (a) a polyolefin elastomer;
  (b) a hydrocarbon oil; and
  (c) optionally, one or more additives selected from the group consisting of antioxidants, rheology modifiers, mineral fillers, polymer fillers, and stabilizers,
  wherein said polyolefin elastomer has a crystallinity in the range of from 10 to less than 50 weight percent,
  wherein said polyolefin elastomer has a dynamic viscosity of 50,000 centipoise or less at 177° C.,
  wherein said hydrocarbon oil has a kinematic viscosity of 200 centistokes or less at 40° C.

BRIEF DESCRIPTION OF THE DRAWINGS

Reference is made to the accompanying drawing in which:
  FIG. 1 shows a cross-sectional view of a loose buffer tube optical fiber cable.

DETAILED DESCRIPTION

Various embodiments of the present invention concern flooding compounds for use in telecommunication cables (e.g., optical fiber cables). As known in the art, "flooding compounds" are substances generally employed to fill certain void spaces in telecommunication cables. The flooding compounds described herein comprise a polyolefin elastomer and a hydrocarbon oil. Additionally, the present flooding compounds can optionally comprise one or more additives.

Polyolefin Elastomer

As just noted, the flooding compounds described herein comprise a polyolefin elastomer. As known in the art, an "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

A "polyolefin elastomer" is an elastomeric polymer containing residues of alpha-olefin ("α-olefin") monomers. In various embodiments, the polyolefin elastomers consist of only α-olefin monomer residues, including ethylene. Such polyolefin elastomers can be either homopolymers or interpolymers. As used herein, "polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)). As used herein, "homopolymer" denotes a polymer comprising repeating units derived from a single monomer type, but does not exclude residual amounts of other components used in preparing the homopolymer, such as chain transfer agents.

Polyolefin elastomers include both polyolefin homopolymers and interpolymers. Examples of polyolefin homopolymers are homopolymers of ethylene and propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In one embodiment, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene ("VLDPE") (e.g., FLEXOMER™ ethylene/1-hexene polyethylene made by The Dow Chemical Company), homogeneously branched, linear ethylene/α-olefin copolymers (e.g. TAFMER™ by Mitsui Petrochemicals Company Limited and EXACT™ by Exxon Chemical Company), and homogeneously branched, substantially linear ethylene/α-olefin copolymers (e.g., AFFINITY™ and ENGAGE™ polyethylene available from The Dow Chemical Company). In various embodiments, the polyolefin elastomers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefin elastomers useful herein also include propylene-, butene-, and other alkene-based copolymers. Such copolymers comprise a majority (i.e., greater than 50 weight percent ("wt %")) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company.

Olefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 to 90 wt %, or from 60 to 75 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 to 99 wt %, from 70 to 98 wt %, or from 90 to 97 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene.

Polyolefin elastomers suitable for use herein can have a degree of crystallinity in the range of from 10 to less than 50 wt %, from 10 to 40 wt %, or from 20 to 30 wt %. The degree of crystallinity of the polyolefin elastomer is measured by the method described in the Test Methods section, below.

Polyolefin elastomers suitable for use herein can have a dynamic viscosity of 50,000 centipoise ("cps" or "cP") or less, or in the range of from 1,000 to 50,000 cps, from 2,000 to 40,000 cps, or from 2,500 to 30,000 cps. Melt viscosity for polyolefin elastomers is determined in accordance with the procedure provided in the Test Methods, below, at 350° F. (177° C.) using a Brookfield viscometer with an SC-31 hot-melt spindle.

Polyolefin elastomers suitable for use herein can have a number-average molecular weight ("Mn") of greater than 2,000 g/mol, at least 4,000 g/mol, or at least 5,000 g/mol. Additionally, the polyolefin elastomers can have an Mn in the range of from 2,000 to 50,000 g/mol, from 4,000 to 40,000 g/mol, from 5,000 to 30,000 g/mol, from 7,000 to 20,000 g/mol, or from 7,000 to 15,000 g/mol. Mn is determined according to the gel-permeation-chromatography method described in the Test Methods section, below.

Polyolefin elastomers suitable for use herein can have a weight-average molecular weight ("Mw") ranging from 1,000 to 100,000 g/mol, from 5,000 to 50,000 g/mol, or from 8,000 to 30,000 g/mol. Mw is determined according to the gel-permeation-chromatography method described in the Test Methods section, below.

Polyolefin elastomers suitable for use herein can have a polydispersity index ("PDI" or "Mw/Mn") ranging from 0.2 to 20, from 0.5 to 10, or from 1 to 5. PDI is determined according to the gel-permeation-chromatography method described in the Test Methods section, below.

Polyolefin elastomers suitable for use herein can have a density of less than 0.91 g/cm$^3$ or less than 0.90 g/cm$^3$. Additionally, the polyolefin elastomers can have a density of at least 0.85 g/cm$^3$ or at least 0.86 g/cm$^3$. Density is determined according to ASTM D 792.

Polyolefin elastomers suitable for use herein can have a melting point of at least 70° C., at least 75° C., at least 80° C., at least 85° C., at least 90° C., at least 95° C., or at least 100° C. The melting point of suitable polyolefin elastomers can be as high as 120° C. Melting point is determined according to the method described in the Test Methods section, below.

Polyolefin elastomers suitable for use herein can have a B value in the range of from 0.1 to 2.0, from 0.5 to 1.5, or from 0.7 to 1.0. B value is determined according to the method described in the Test Methods section, below.

Polyolefin elastomers suitable for use herein can have a crystallization temperature ("Tc") in the range of from 40 to 100° C., or from 50 to 80° C. Crystallization temperature is determined according to the method described in the Test Methods section, below.

A specific example of a suitable ethylene-based polyolefin elastomer is an ethylene/octene copolymer having a viscosity of 8,200 cps and a density of 0.889 g/cm$^3$. A specific example of a suitable propylene-based polyolefin elastomer is a propylene/ethylene copolymer having a viscosity of 2,741 cps and a density of 0.884 g/cm$^3$. An example of a commercially available propylene/ethylene polyolefin elastomer is AFFINITY™ GA 1875, which is available from The Dow Chemical Company, Midland, Mich., USA.

Hydrocarbon Oil

As noted above, the flooding compound additionally contains a hydrocarbon oil. Hydrocarbon oils are known in the art of flooding compounds. Typical examples of hydrocarbon oils include mineral oils (e.g., paraffinic oils, naphthenic oils, and aromatic oils) and low-molecular-weight polyolefin oils (e.g., polybutene oil). In an embodiment, the hydrocarbon oil is a paraffinic oil.

The hydrocarbon oil employed herein can have a number-average molecular weight of 2,000 g/mol or less, 1,000 g/mol or less, or 800 g/mol or less.

The hydrocarbon oil employed herein can have a kinematic viscosity of 500 centistokes ("cSt") or less, 200 cSt or less, 100 cSt or less, or 50 cSt or less at 40° C. Viscosity of the hydrocarbon oil is measured according to ASTM D445.

An example of a suitable commercially available hydrocarbon oil is SUNPAR™ 110, which has a kinematic viscosity of 21.2 cSt at 40° C., available from Sunoco Inc., Pittsburgh, Pa., USA.

Additives

The flooding compound can optionally comprise one or more additives selected from the group consisting of antioxidants, rheology modifiers (e.g., thixotropic agents), stabilizers (e.g., UV stabilizers), mineral fillers, polymer fillers, and combinations thereof.

Antioxidants, when employed, can be present in any conventional amount, such as an amount ranging from 0.01 to 1 wt %, or from 0.01 to 0.3 wt %, based on the total weight of the flooding compound. Suitable antioxidants include, but are not limited to, hindered phenols such as tetrakis[methylene(3,5-di-tert-butyl-4-hydroxyhydrocinnamate)] methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Thixotropic agents, when employed, can be present in any conventional amount, such as an amount ranging from greater than 0 to 5 wt %, based on the total weight of the flooding compound. An example of a suitable thixotropic agent includes, but is not limited to, fumed silica. Suitable commercial thixotropic agents include, but are not limited to, AEROSIL™ products from Evonik Corp. BYK Industries and Kusumoto Chemicals also supply suitable commercial thixotropic agents.

In various embodiments, the flooding compound can be free or substantially free of thixotropic agents. As used herein, the term "substantially free" shall mean a concentration of less than 10 parts per million by weight based on the total weight of the flooding compound.

In various embodiments, the flooding compound can comprise one or more additional fillers. Such fillers include, but are not limited to, hollow microspheres (e.g., glass or polymeric), mineral inorganic compounds, polymeric fillers, and the like. When employed, additional fillers can be present in any conventional amount, such as an amount ranging from greater than 0 up to 60 wt %.

Flooding Compound

The flooding compound can be prepared by simple compounding techniques known in the art. For instance, the polyolefin elastomer, the hydrocarbon oil, and any optional additives can be compounded in a liquid operational mixer with temperature control. For instance, the ingredients can be compounded in a batch or continuous mixer. Suitable batch mixers include, but are not limited to, Banbury, Silverson, Dynamix tank mixers and agitators, and Littleford batch mixers. Continuous mixers include twin and single-screw extruders, Farrel mixers, and Buss co-kneaders.

The above-described polyolefin elastomer can be present in the flooding compound in an amount ranging from 10 to 80 wt %, from 20 to 60 wt %, or from 30 to 50 wt %, based on the combined weight of the polyolefin elastomer and hydrocarbon oil.

The above-described hydrocarbon oil can be present in the flooding compound in an amount ranging from 20 to 90 wt %, from 40 to 80 wt %, or from 50 to 70 wt %, based on the combined weight of the polyolefin elastomer and hydrocarbon oil.

In one or more embodiments, the resulting flooding compound can have an apparent viscosity in the range of from 20 to 400 centipoise ("cps"), from 50 to 400 cps, from 200 to 400 cps, or from 300 to 400 cps, as measured at 150° C. according to ASTM D3236.

In various embodiments, the flooding compound can have a drop point of at least 65° C., at least 70° C., at least 75° C., at least 80° C., and up to 120° C. Drop point is determined according to ASTM D127.

In various embodiments, the flooding compound can have an oil separation when aged for 24 hours at 22° C. of less than 0.1, less than 0.05, or less than 0.01. Oil separation is determined according to ASTM D1742.

In various embodiments, the flooding compound can have at most a medium tackiness, and preferably a low tackiness. Specifically, in one or more embodiments, the flooding compound can have a minimal loading weight ("MLW") of at least 50 g, at least 75 g, at least 100 g, at least 125 g, or at least 150 g. MLW is determined according to the method provided in the Test Methods section, below.

Optical Fiber Cable

In various embodiments, an optical fiber cable can be prepared that comprises at least one optical fiber, a plurality of buffer tubes, and the above-described flooding compound.

A cross-sectional view of a common loose-buffer-tube optical fiber cable is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more empty buffer tube positions 10 to maintain cable geometry. The cable jacket 14 can generally be fabricated from a polyethylene-based material.

The above-described flooding compound can be used to fill the void spaces surrounding optic fibers 6 within buffer tubes 2. Additionally, the flooding compound can be used to fill void spaces surrounding and between the buffer tubes 2, but within the cable jacket 14. The flooding compound provides the suspension and protection needed in the immediate environment surrounding the fibers, including eliminating air space. The flooding compound also provides a barrier against water penetration, which is detrimental to optic transmission performance.

Many other buffer tube cable designs are possible. The size and materials of construction for the central strength and tensile member, the dimensions and number of buffer tubes, and the use of metallic armors and multiple layers of jacketing material are among the design elements. Such designs that incorporate a flooding compound are contemplated within the scope of the present disclosure.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and flooding compound are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

Definitions

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Residue," when referring to a monomer, means that portion of a monomer molecule which resides in a polymer molecule as a result of being polymerized with another monomer or comonomer molecule to make the polymer molecule.

Test Methods

Density

Density is determined according to ASTM D792.

For calculated density of the flooding compounds in Example 1, densities are calculated by the following formula:

$$\text{Density} = \Sigma \text{weight percent} \cdot \text{density of each component}$$

Melt Index

Melt index, or $I_2$, is measured in accordance with ASTM D 1238, condition 190° C./2.16 kg, and is reported in grams eluted per 10 minutes. The $I_{10}$ is measured in accordance with ASTM D 1238, condition 190° C./10 kg, and is reported in grams eluted per 10 minutes.

Differential Scanning Calorimetry (Crystallinity, Melting Point, Crystallization Temperature)

Differential Scanning calorimetry ("DSC") is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Drop Point

Drop point is determined according to ASTM D127.

Viscosity

Apparent viscosity of the flooding compounds is determined according to ASTM D3236 at 150° C. Kinematic viscosity can be calculated by using apparent viscosity divided by fluid density.

Melt viscosity of polymer components (i.e., polyolefin elastomers) is determined in accordance with the following procedure using a Brookfield Laboratories DVII+Viscometer in disposable aluminum sample chambers. The spindle used is an SC-31 hot-melt spindle, suitable for measuring viscosities in the range of from 10 to 100,000 centipoise (0.1 to 1,000 grams/(cm·second)). A cutting blade is employed to cut samples into pieces small enough to fit into the 1-inch wide, 5-inches long (2.5-cm wide, 13-cm long) sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on and set to a shear rate, which leads to a torque reading in the range of 30 to 60 percent. Readings are taken every minute for about 15 minutes, or until the values stabilize, then the final reading is recorded.

B Value

The B value is calculated as B=$P_{OE}$/(2×$P_O P_E$); where $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, where the molar fraction of each component, except the terminal component, is a value calculated, and the B value is calculated based on a chart of C-NMR (270 MHz).

Tackiness

Determine tackiness using a device as taught in U.S. Pat. No. 2,406,989 ("the '989 patent"). Specifically, the device comprises, in general, two portions—a base or surface-contacting portion, designated as "A," and a counter-balancing portion, designated as "B." These portions are made up, as shown in the drawing of the '989 patent, by a unitary, comparatively light-weight (but rigid) strip "I" bent to form the flat counter-balancing portion "B" disposed at a desired angle to the base "A." Around the base "A" is tightly wrapped aluminum sheet with smooth surfaces. With the adhesive surface uppermost, base "A" is attached to adhesive surface under a loading of weight (2 g to 150 g) at the center of A for 30 seconds and is then removed. The surface is considered to be tack free if base "A" is pulled completely away from the surface by the counter-balancing portion "B" in less than 10 seconds. By changing the weight, the minimal loading weight to keep portion "A" staying on the surface is recorded as "minimal loading weight (MLW)". A high MLW value indicates lower tackiness and a low MLW value indicates higher tackiness.

Gel Absorption

A 75-mil-thick compression-molded specimen (~0.5×0.2 inches) of jacket material (LDPE, MDPE, HDPE or polypropylene), is immersed in a flooding compound at 60° C. After 10 days, the flooding compound covering the surface of the jacket material is wiped out and the weight gain of the jacket material plaque is calculated by comparing its weight before and after aging.

Gel Permeation Chromatography

A high-temperature gel permeation chromatography ("GPC") system is employed, equipped with Robotic Assistant Deliver ("RAD") system for sample preparation and sample injection. The concentration detector is an Infra-red detector (IR4) from Polymer Char Inc. (Valencia, Spain). Data collection is performed using Polymer Char DM 100 Data acquisition box. The carrier solvent is 1,2,4-trichlorobenzene ("TCB"). The system is equipped with an on-line solvent degas device from Agilent. The column compartment is operated at 150° C. The columns are four Mixed A LS 30-cm, 20-micron columns. The solvent is nitrogen-purged TCB containing approximately 200 ppm 2,6-di-t-butyl-4-methylphenol ("BHT"). The flow rate is 1.0 mL/min, and the injection volume is 200 μl. A 2 mg/mL sample concentration is prepared by dissolving the sample in nitrogen-purged and preheated TCB (containing 200 ppm BHT) for 2.5 hours at 160° C. with gentle agitation.

The GPC column set is calibrated by running twenty narrow molecular weight distribution polystyrene ("PS") standards. The molecular weight ("MW") of the standards ranges from 580 to 8,400,000 g/mol, and the standards are contained in six "cocktail" mixtures. Each standard mixture has at least a decade of separation between individual molecular weights. The equivalent polypropylene ("PP") molecular weights of each PS standard are calculated by using the following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PP}^{a_{PS}-1}}{K_{PP}} \right)^{\frac{1}{a_{PS}+1}},$$

where $M_{PP}$ is PP equivalent MW, $M_{PS}$ is PS equivalent MW, log K and a values of Mark-Houwink coefficients for PP and PS are listed below.

| Polymer | a | log K |
| --- | --- | --- |
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$Mn = \frac{\sum_i Wf_i}{\sum_i (Wf_i/M_i)}, \quad (2)$$

$$Mw = \frac{\sum_i (Wf_i * M_i)}{\sum_i Wf_i}, \quad (3)$$

where $Wf_i$ and $M_i$ are the weight fraction and molecular weight of elution component i, respectively.

Materials

The following materials are employed in the Examples, below.

An ethylene-octene polyolefin elastomer ("E-O POE") is employed, having an ethylene content 71.9 wt %, an Mn of 10,000 g/mol, a crystallinity of 28.4 wt %, a density of 0.887 g/cm³, a crystallization temperature of 71.37° C., a melting point of 85.6° C., a B value of 0.9, and a dynamic viscosity of 8,200 cps at 177° C.

The E-O POE is prepared in a continuous solution polymerization. All reagents (monomer, comonomer, hydrogen) are dissolved into a solvent carrier feed stream and injected into a recirculated, single loop reactor. The solvent is ISOPAR E. The catalyst is (titanium, [N-(1,1-dimethylethyl)-1,1-dimethyl-1-[(1,2,3,4,5-η)-2,3,4,5-tetramethyl-2,4-cyclopentadien-1-yl]silanaminato(2-)-κN][(1,2,3,4-η)-1,3-pentadiene]-). Two co-catalysts are used: tris(2,3,4,5,6-pentafluorophenyl)borane and modified methylaluminoxane. The two co-catalysts are mixed prior to injection, and this mixture is fed to the reactor separately from the catalyst. The alpha-olefin comonomer (1-octene) concentration in the feed and in the reactor is used to controlled the density of the polymer, and the hydrogen concentration is used to control the melt viscosity (or molecular weight) of the polymer. The reactor product stream is passed through additional unit operations in order to remove the unreacted reagents and solvent. The polymer melt is then extruded into pellets. The polymer is stabilized with ppm amounts of IRGANOX™ 1010. The E-O POE is prepared under the following polymerization conditions:

| | |
|---|---|
| Temperature (° C.) | 133 |
| Pressure (barg) | 34.3 |
| Ethylene concentration (kg/m³) | 14.0 |
| Polymer concentration (wt %) | 38.3 |
| 1-Octene concentration | Reactor Exit = 54.4 kg/m³ |
| | Feed = 20.3 wt % |
| Reynolds number | Reaction pipe = 6700 |
| | Heat exchanger tubes = 53 |
| Residence time (min.) | 19.8 |
| Recycle Ratio | 37.3 |
| Catalyst Efficiency (lb polymer/lb catalyst metal) | 1,700,000 |

A propylene-ethylene polyolefin elastomer ("P-E POE") is employed, having a propylene content of 95 wt %, an Mn of 14,500 g/mol, a crystallinity of 28.6 wt %, a density of 0.884 g/cm³, a crystallization temperature of 77.9° C., a melting point of 105° C., a B value of 0.93, and a dynamic viscosity of 2,741 cps at 177° C.

The P-E POE is prepared using a hafnium metal complex of a polyvalent aryloxyether catalyst that is hafnium, [[2′,2′′′-[(1R,2R)-1,2-cylcohexanediylbis(methyleneoxy-κO)]bis[3-(9H-carbazol-9-yl)-5-methyl[1,1′-biphenyl]-2-olato-κO]](2-)]dimethyl:

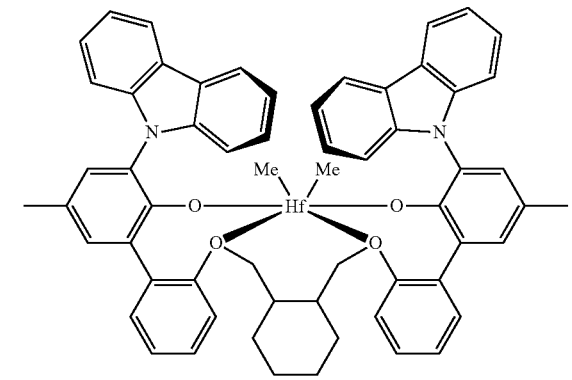

The catalyst and cocatalyst component solutions are metered using pumps and mass flow meters and are combined with the catalyst flush solvent and introduced into the bottom of the reactor. The cocatalyst used is a long-chain alkyl ammonium borate of approximate stoichiometry equal to methyl di(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of about 1/3. The cocatalyst is in a molar ratio based on Hf of 1.2/1, and MMAO (25/1 Al/Hf).

The polymerization process is exothermic. There are about 900 British thermal units (BTUs) released per pound (2009 kJ/kg) of propylene polymerized and about 1,500 BTUs released per pound (3489 kJ/kg) of ethylene polymerized. The primary process design consideration is the removal of the heat of reaction. The propylene-ethylene copolymers are produced in a low-pressure, solution polymerization loop reactor, made up of a 3-inch (76-mm) loop pipe plus two heat exchangers, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures.

The solvent used is a high purity iso-paraffinic fraction available from Exxon under the trademark ISOPAR™ E. Fresh propylene is passed through a bed of Selexsorb COS for purification before mixing with a recycle stream containing solvent, propylene, ethylene, and hydrogen. After mixing with the recycle stream, the combined stream is passed through a bed of 75 wt % Molecular Sieve 13× and 25 wt % Selexsorb CD for further purification before using a high pressure 700 psig (4826 kPa) feed pump to pass the contents to the reactor. Fresh ethylene is passed through a Selexsorb COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and a control temperature of 150° C. The propylene conversion in the reactor is maintained by controlling the catalyst injection rate. The reaction temperature is maintained by controlling the water temperature across the shell side of the heat exchanger at 85° C. The residence time in the reactor is short (about 10 minutes).

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer and act as stabilizers to prevent polymer degradation while in storage before subsequent fabrication at an end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

SUNPAR™ 110 is a paraffin oil having a kinematic viscosity of 21.2 cSt at 40° C., which is commercially available from Sunoco Inc., Pittsburgh, Pa., USA.

The polybutene oil has an average Mn of ~320 g/mol, a kinematic viscosity of 27 to 33 cSt at 38° C., an isobutylene content of greater than 90%, a density of 0.84 g/mL at 25° C., a glass transition temperature ($T_g$) of −90.5° C., a pour point (ASTM D97) of −51° C., and is commercially available from Sigma-Aldrich, St. Louis, Mo., USA.

IRGANOX™ 1035 is a commercial antioxidant having the chemical name thiodiethylene bis[3-(3,5-di-tert-butyl-4-hydroxy-phenyl)propionate], which is available from BASF SE, Ludwigshafen, Germany.

AXELERON™ GP 6059 BK is a low-density polyethylene ("LDPE") jacket compound having a density of 0.932 g/cm$^3$, a melt index ("$I_2$") of 0.60 g/10 min., a carbon black content of 2.6 wt %, and is commercially available from The Dow Chemical Company, Midland, Mich., USA.

AXELERON™ FO 8864 BK is a medium-density polyethylene jacket ("MDPE") compound having a density of 0.941 g/cm$^3$, a melt index ("$I_2$") of 0.70 g/10 min., a carbon black content of 2.6 wt %, and is commercially available from The Dow Chemical Company, Midland, Mich., USA.

AXELERON™ FO 6318 BK is a high-density polyethylene ("HDPE") jacket compound having a density of 0.954 g/cm$^3$, a melt index ("$I_2$") of 0.70 g/10 min., a carbon black content of 2.6 wt %, and is commercially available from The Dow Chemical Company, Midland, Mich., USA.

BC245MO™ is a high impact polypropylene ("PP") copolymer jacket compound having a density of 0.905 g/cm$^3$, a melt flow rate at 230° C. and 2.16 kg of 3.5 g/10 min., and is commercially available from Borealis AG, Vienna, Austria.

NAPTEL™ 500 is a commercial flooding compound comprising 77 wt % polyisobutylene wax and 23 wt % mineral oil, which has a viscosity at 150° C. of from 40 to 60 Cp (ASTM D 3236), a ring-and-ball softening point of between 80 and 100° C. (ASTM E 28), and is commercially available from Soltex Inc., Houston, Tex., USA.

SONNEBORN™ 683 is a commercial flooding compound that is primarily a wax-type material without branching polyolefins, which has a melting point of at least 200° F. (93.3° C.), a viscosity at 302° F. (150° C.) in the range of from 1,700 to 1,800 SUS (ASTM D 2161), and is commercially available from Sonneborn, LLC, Parsippany, N.J., USA.

EXAMPLES

Example 1

Prepare four Samples (S1-S4) according to the following procedure and the formulations provided in Table 1, below. Each component is first weighed then mixed in a heated container under agitation. The temperature was set at 80° C. for samples containing E-O POE and 120° C. for samples containing P-E POE. After agitating for 10 minutes, the heat is turned off and the flooding compound is poured out to collect.

TABLE 1

| Compositions of S1-S4 | | | | |
|---|---|---|---|---|
|  | S1 | S2 | S3 | S4 |
| E-O POE (wt %) | 39.8 | 39.8 | — | — |
| P-E POE (wt %) | — | — | 49.8 | 49.8 |
| SUNPAR 110 (wt %) | 60.0 | — | 50.0 | — |
| Polybutene oil (wt %) | — | 60.0 | — | 50.0 |
| Antioxidant (wt %) | 0.2 | 0.2 | 0.2 | 0.2 |
| Total: | 100 | 100 | 100 | 100 |

Analyze S1-S4 and Comparative Samples 1 and 2 (CS1-CS2) according to the Test Methods described above. CS1 is NAPTEL™ 500, and is tested as received. CS2 is SONNEBORN™ 683, and is tested as received. The results are provided in Table 2, below.

TABLE 2

| Properties of S1-S4 and CS1-CS2 | | | | | | |
|---|---|---|---|---|---|---|
|  | S1 | S2 | S3 | S4 | CS1 | CS2 |
| Viscosity @ 150° C. (cP) | 313 | 432 | 349 | 325 | 49 | 307 |
| Tackiness | High (<2 g) | High (<2 g) | Low (100 g) | Low (>150 g) | High (<2 g) | Medium (50 g) |
| Drop Point (° C.) | 81.4 | >80 | 91.2 | >90 | 96.0 | 102.8 |
| Density (g/cm$^3$) (calculated) | 0.88 | 0.88 | 0.86 | 0.86 | 0.88 | 0.87 |
| Gel Absorption in LDPE (%) | 7.93 | 6.15 | 10.36 | 4.43 | 4.91 | 11.30 |
| Gel Absorption in MDPE (%) | 5.53 | 3.57 | 7.38 | 2.44 | 2.13 | 6.52 |

TABLE 2-continued

Properties of S1-S4 and CS1-CS2

|  | S1 | S2 | S3 | S4 | CS1 | CS2 |
|---|---|---|---|---|---|---|
| Gel Absorption in HDPE (%) | 3.55 | 1.92 | 4.24 | 1.68 | 1.47 | 3.89 |
| Gel Absorption in PP (%) | 6.54 | 3.85 | 6.87 | 2.97 | 2.34 | 4.82 |

The ethylene-octene copolymer Samples (S1 and S2) both show similar levels of tackiness as CS1 and CS2, but S2 using polybutene oil yields less weight pick up value than CS2, which suggests less oil sweat-out to jacket. The propylene-ethylene copolymer Samples (S3 and S4) both show significant reduced tackiness compared to CS1 and CS2. In addition, S4 using polybutene oil yields less weight pick up value than CS2, which suggests less oil sweat-out to jacket.

Example 2

Prepare six additional Samples (S5-S10) and one additional Comparative Sample (CS3) according to the procedure provided in Example 1, above, and the formulations provided in Table 3, below. Measure the viscosity of each sample according to the Test Method provided above. Results are reported in Table 3, below.

TABLE 3

Compositions and Viscosity of S5-S10 and CS3

|  | CS3 | S5 | S6 | S7 | S8 | S9 | S10 |
|---|---|---|---|---|---|---|---|
| EO-POE (wt %) | 99.8 | 79.8 | 65.5 | 52.4 | 42.5 | 32.8 | 23.3 |
| SUNPAR 110 (wt %) | — | 20 | 34.3 | 47.4 | 57.3 | 67 | 76.5 |
| Antioxidant (wt %) | 0.2 | 0.2 | 0.2 | 0.2 | 0.2 | 0.2 | 0.2 |
| Total: | 100 | 100 | 100 | 100 | 100 | 100 | 100 |
| Viscosity @ 150° C. (cP) | 5,286 | 1,895 | 1,247 | 734.0 | 348.7 | 114.4 | 43.1 |

Example 3

Prepare six additional Samples (S11-S16) and one additional Comparative Sample (CS4) according to the procedure provided in Example 1, above, and the formulations provided in Table 4, below. Measure the viscosity of each sample according to the Test Method provided above. Results are reported in Table 4, below.

TABLE 4

Compositions and Viscosity of S11-S16 and CS4

|  | CS3 | S11 | S12 | S13 | S14 | S15 | S16 |
|---|---|---|---|---|---|---|---|
| EO-POE (wt %) | — | 39.8 | 29.8 | 19.8 | — | — | — |
| PE-POE (wt %) | 99.8 | — | — | — | 49.8 | 39.8 | 29.8 |
| Polybutene oil (wt %) | — | 60 | 70 | 80 | 50 | 60 | 70 |
| Antioxidant (wt %) | 0.2 | 0.2 | 0.2 | 0.2 | 0.2 | 0.2 | 0.2 |
| Total: | 100 | 100 | 100 | 100 | 100 | 100 | 100 |
| Viscosity @ 150° C. (cP) | 5,931 | 432 | 186 | 48 | 325 | 191 | 83 |

The invention claimed is:

1. A flooding compound for a telecommunications cable, said flooding compound comprising:
   (a) a polyolefin elastomer; and
   (b) a hydrocarbon oil,
   wherein said polyolefin elastomer has a crystallinity in the range of from 10 to less than 50 weight percent,
   wherein said polyolefin elastomer has a dynamic viscosity of 50,000 centipoise or less at 177° C.,
   wherein said hydrocarbon oil has a kinematic viscosity of 200 centistokes or less at 40° C.,
   wherein said polyolefin elastomer consists of only α-olefin monomer residues,
   wherein said flooding compound has an apparent viscosity in the range of from 20 to 400 centipoise at 150° C., as determined according to ASTM D3236.

2. The flooding compound of claim 1, wherein said polyolefin elastomer has an Mn of greater than 5,000 g/mol; wherein said polyolefin elastomer has a weight-average molecular weight ("Mw") in the range of from 5,000 to 50,000 g/mol; wherein said polyolefin elastomer has a polydispersity index ("Mw/Mn") in the range of from 1 to 5.

3. The flooding compound of claim 1, wherein said polyolefin elastomer has a density of less than 0.910 g/cm$^3$; wherein said polyolefin elastomer has a melting point of at least 70° C.

4. The flooding compound of claim 1, wherein said polyolefin elastomer is selected from the group consisting of an ethylene-based polyolefin elastomer, a propylene-based polyolefin elastomer, and combinations thereof.

5. The flooding compound of claim 4, wherein said ethylene-based polyolefin elastomer is an ethylene/octene copolymer, wherein said propylene-based polyolefin elastomer is a propylene/ethylene copolymer.

6. The flooding compound of claim 1, wherein said flooding compound has a drop point of at least 65° C., as determined according to ASTM D127.

7. The flooding compound of claim 1 further comprising one or more additives selected from the group consisting of antioxidants, rheology modifiers, mineral fillers, polymer fillers, and stabilizers.

8. The flooding compound of claim 1, wherein said hydrocarbon oil is selected from the group consisting of a paraffinic oil and a polybutene oil.

9. An optical fiber cable comprising:
   (a) at least one optical fiber;
   (b) a plurality of buffer tubes; and
   (c) the flooding compound of claim 1.

10. A flooding compound for a telecommunications cable, said flooding compound consisting of:

(a) a polyolefin elastomer;
(b) a hydrocarbon oil; and
(c) optionally, one or more additives selected from the group consisting of antioxidants, rheology modifiers, mineral fillers, polymer fillers, and stabilizers,
wherein said polyolefin elastomer has a crystallinity in the range of from 10 to less than 50 weight percent,
wherein said polyolefin elastomer has a dynamic viscosity of 50,000 centipoise or less at 177° C.,
wherein said hydrocarbon oil has a kinematic viscosity of 200 centistokes or less at 40° C.,
wherein said polyolefin elastomer consists of only α-olefin monomer residues,
wherein said flooding compound has an apparent viscosity in the range of from 20 to 400 centipoise at 150° C., as determined according to ASTM D3236.

11. The flooding compound of claim 10, wherein said flooding compound has a drop point of at least 65° C., as determined according to ASTM D127.

12. The flooding compound of claim 10, wherein said polyolefin elastomer has an Mn of greater than 5,000 g/mol, wherein said polyolefin elastomer has a weight-average molecular weight ("Mw") in the range of from 5,000 to 500,000 g/mol, wherein said polyolefin elastomer has a polydispersity index ("Mw/Mn") in the range of from 1 to 5, wherein said polyolefin elastomer has a density of less than 0.910 g/cm$^3$; wherein said polyolefin elastomer has a melting point of at least 70° C.

13. The flooding compound of claim 10, wherein said polyolefin elastomer is selected from the group consisting of an ethylene-based polyolefin elastomer, a propylene-based polyolefin elastomer, and combinations thereof.

14. A fiber optic cable comprising:
(a) at least one optical fiber;
(b) a plurality of buffer tubes; and
(c) the flooding compound of claim 10.

* * * * *